July 31, 1934.  L. JONES  1,968,455
METHOD AND APPARATUS FOR FORMING PIPE
Filed June 30, 1932   5 Sheets-Sheet 1

INVENTOR
Lloyd Jones,
BY
ATTORNEYS.

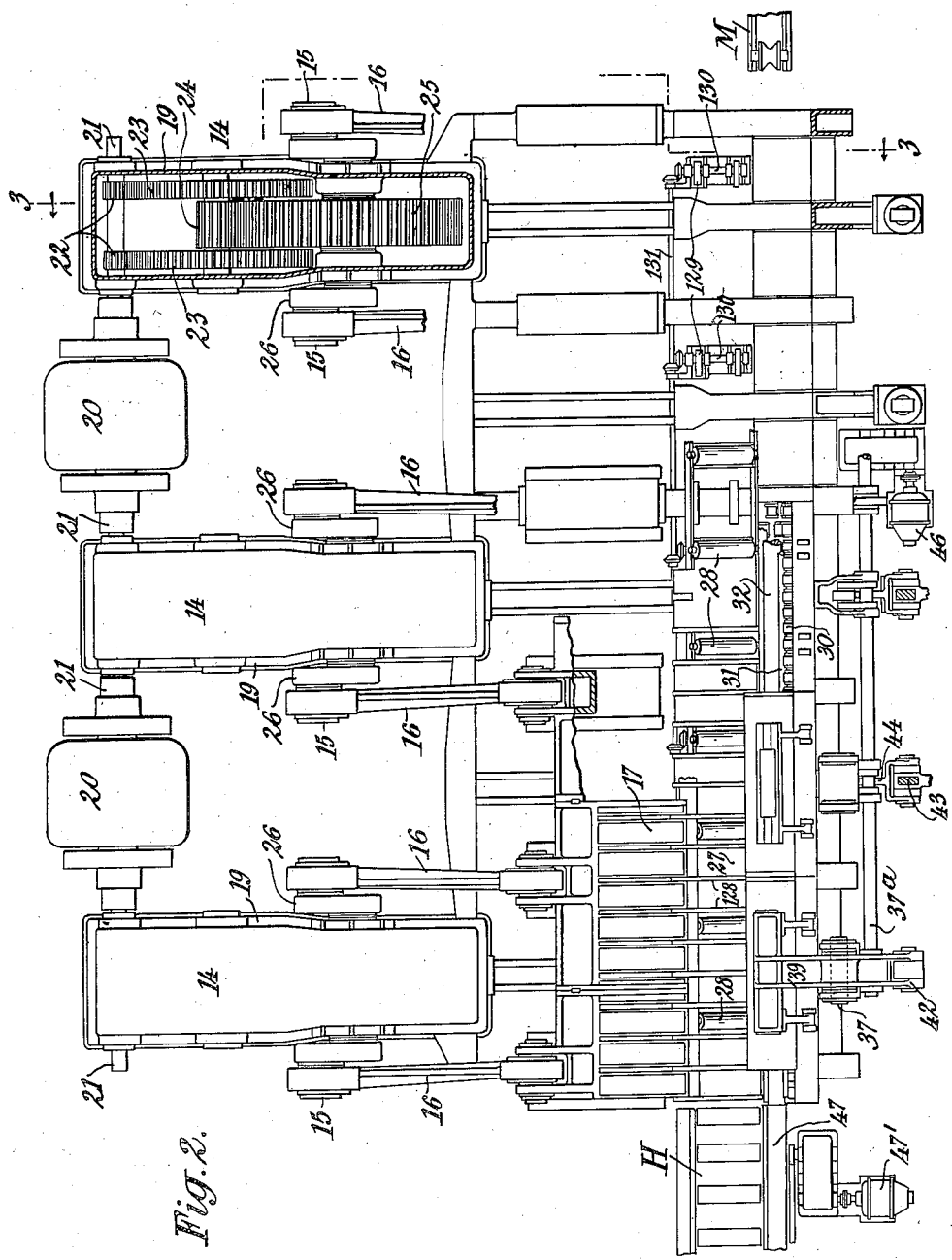

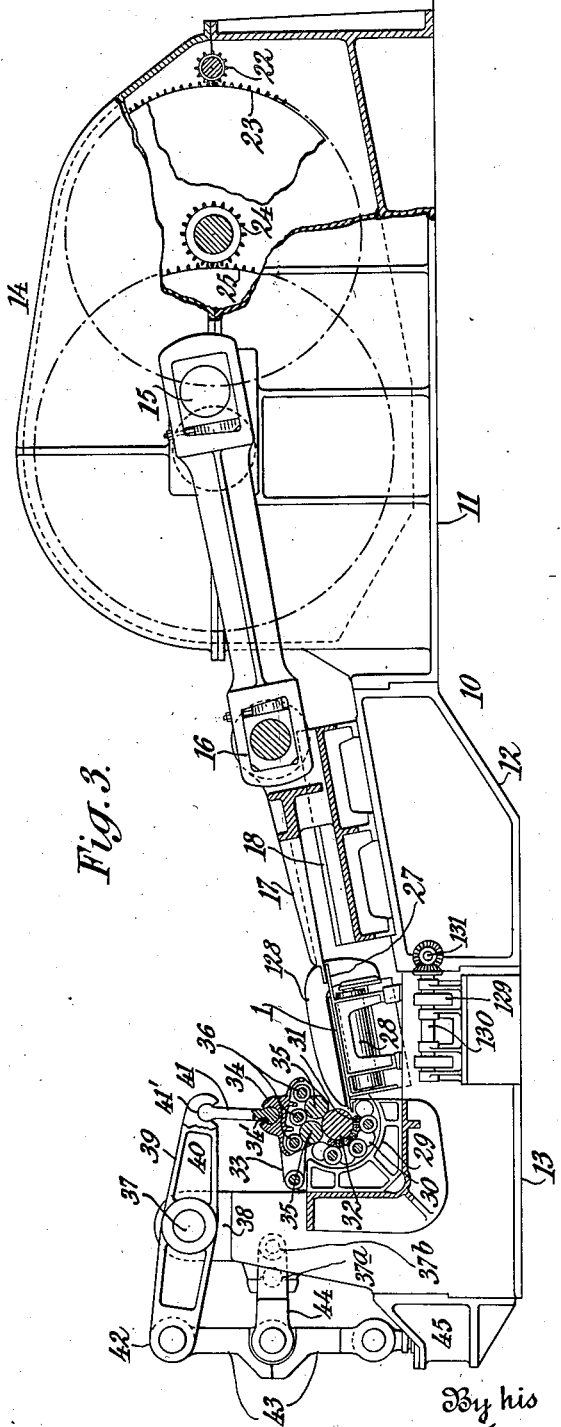

July 31, 1934.  L. JONES  1,968,455

METHOD AND APPARATUS FOR FORMING PIPE

Filed June 30, 1932  5 Sheets-Sheet 4

INVENTOR
Lloyd Jones,
BY
ATTORNEYS.

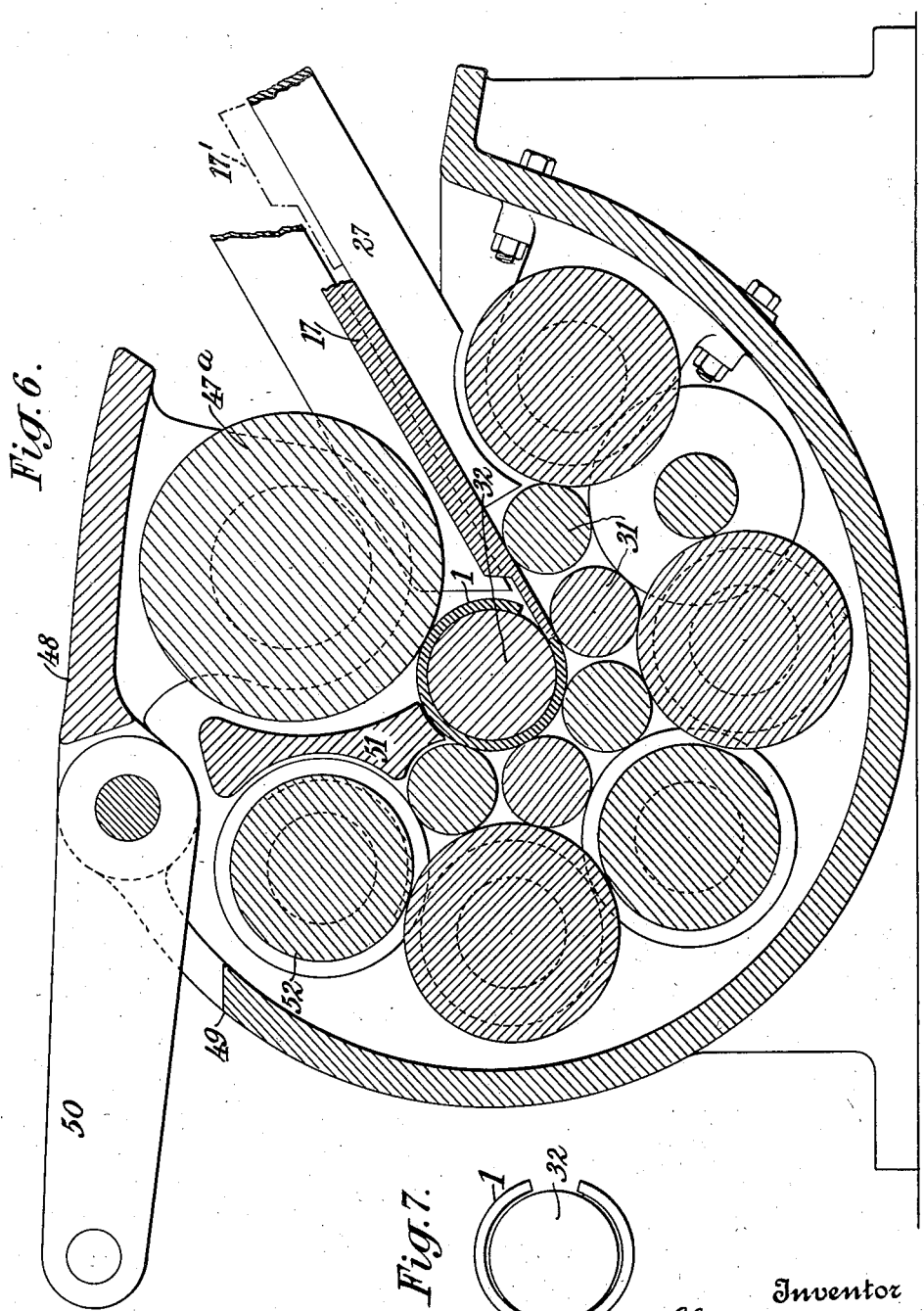

Patented July 31, 1934

UNITED STATES PATENT OFFICE 1,968,455

METHOD AND APPARATUS FOR FORMING PIPE

Lloyd Jones, Salem, Ohio

Application June 30, 1932, Serial No. 620,085

28 Claims. (Cl. 153—49)

This invention relates to machinery for forming pipe or tubing from a sheet. More particularly the invention relates to improvements in the method of manufacture and in the pipe former equipment wherein the sheet material or skelp is first formed into condition for joining the edges preparatory to completing the joint.

One of the objects of the present invention is to provide an improved mechanism for the manufacture of pipe or tubing from a strip of material or skelp which will obviate certain disadvantages of the present day equipment, including excessive wear on the die, and the tendency of the material to stick in the dies.

Another object is to increase the speed of operation of the present manufacturing methods and to reduce the time required in changing from one size pipe to another.

A further object is to simplify the method and to minimize the difficulty of maintaining a straight, uniform seam for welding and the difficulty of lining up and starting the equipment for different sizes of pipe, existing in present day equipment.

A still further object is to simplify the operation and to minimize the difficulty of forming pipes from skelp of high carbon and alloy steels.

The two principal processes for the manufacture of pipe in general use to-day are briefly as follows:

(1) By means of hydraulic presses using dies for forming the pipe in approximately three operations. The two edges are first curled up to the approximate radius of the finished pipe, this curvature extending in from the edge approximately one-fourth of the width of the skelp on each side thereof. The second operation is to bend the skelp about the middle of the strip, roughly forming an elongated ellipse. The third operation is to press this roughly-formed ellipse into a circular tube.

The principal disadvantages of this system are:

(a) The wear on the dies is often excessive due to the scale and it is often necessary to pickle the skelp prior to forming in the dies.

(b) The pipe has a tendency to stick in the dies.

(c) The speed of the operations is commonly slow.

(2) By means of continuous forming mills wherein the flat skelp is entered into one end of this mill and is gradually formed into a circular pipe by being pulled endwise or longitudinally through a succession of rolls.

The principal disadvantages of this system are:

(a) It is difficult to keep a straight, uniform seam for welding.

(b) The lining up and starting of the equipment for different sizes of pipe is very difficult.

(c) The forming of high carbon and alloy steels is extremely difficult.

(d) The time for changing from one size pipe to another is very expensive.

These several disadvantages are obviated by my invention, and certain other improvements are provided which will hereinafter be more fully pointed out.

The principal feature of the invention lies in forming the pipe by pushing the strip or skelp edgewise between dies, preferably of roll form, which form the skelp into substantially a split cylinder. Preferably a mandrel is used around which the skelp is formed, and preferably the die rolls are supported by backing rolls, so that the load is taken off the die rolls.

In order that the invention may be more clearly understood, I have illustrated what I believe to be the preferred embodiment of the invention in the accompanying drawings, which are used in an illustrative sense and not in a limiting one. While this invention relates particularly to a new method and to improvements in the mechanism of forming pipe, this embodiment is shown as a part of the machinery for the continuous and complete manufacture of the finished pipe from the skelp or blank material.

Fig. 2 is a plan view of the pipe former parts partly in section and partly broken away.

Fig. 3 is a side view of the pipe former, partly in section, taken on the line 3—3 of Fig. 2, and partly broken away.

Fig. 6 is a view similar to Fig. 4, showing a modification in the number and arrangement of the pressure rolls and the formed skelp after it has been acted upon by the ram.

Fig. 7 is a sectional view through the mandrel and the pipe, showing the position of the pipe with relation to the mandrel after it has freed itself therefrom upon release of the pressure of the pressure rolls.

Figure 1:
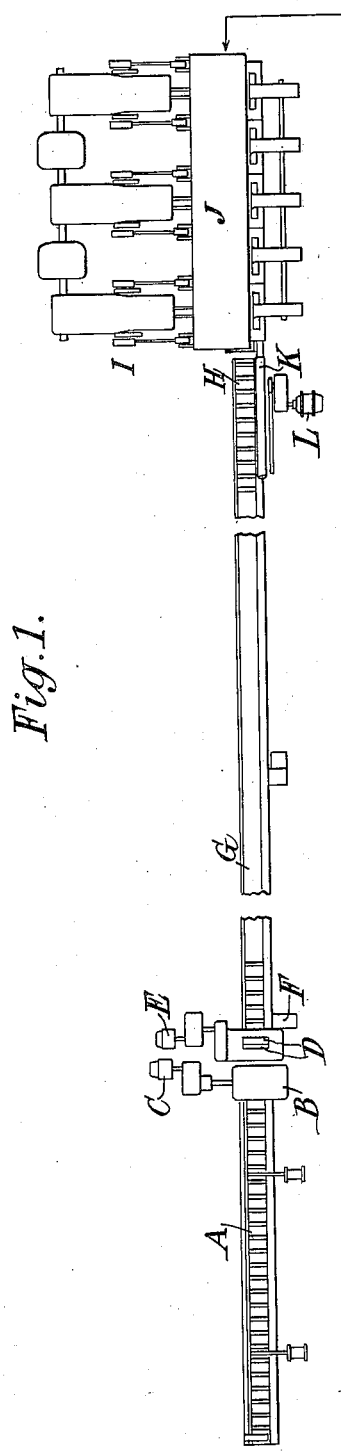
Figure 1 is a diagrammatic view, showing the pipe former and its relation with the units of a complete plant for the continuous manufacture of the finished pipe from the skelp, Fig. 1a being a continuation of Fig. 1.
Figure 1A:
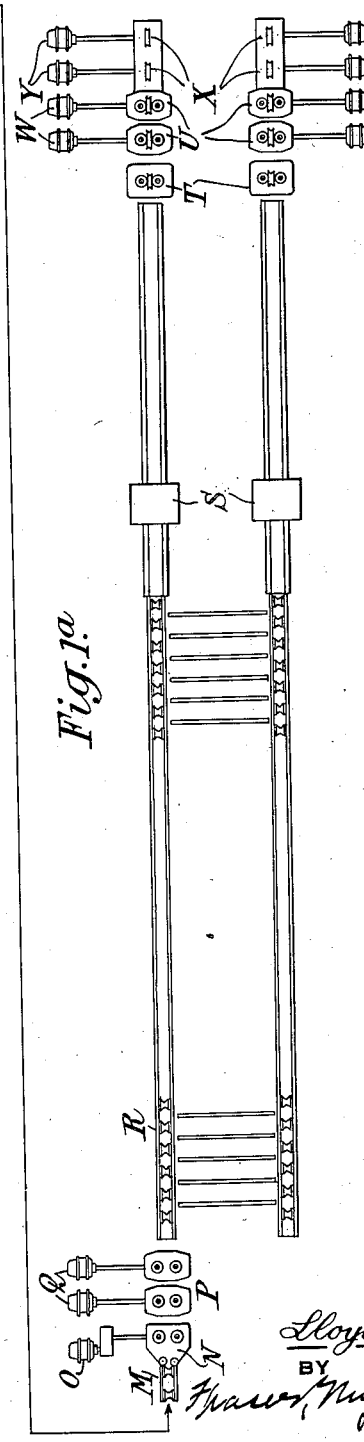

Referring to the drawings and to Fig. 1, the skelp or blank material from which the pipe is to be made, in lengths corresponding to the length of the pipe, is placed on conveyor A, whose rolls are driven in any suitable manner, as, for example, by line shaft with bevel gears and motor-driven (not shown) and is drawn through rotary shears B, driven by motor C, and where it is side-trimmed. From the shears B the skelp and scrap pass through scrap rolls D, driven by motor E, which rolls consisting of two rotating shafts with cutters on each shaft. These cutters cut the scrap into lengths suitable for the charging box of the furnace and are then discharged into scrap box F. The trimmed skelp is next carried by conveyor G, driven in the same manner as conveyor A, to rolls H abreast die-rolls in forming machine I, to be hereinafter more fully described. The skelp is pushed edgewise into the dies of the forming machine I by ram J and formed into substantially a split cylinder. The partially formed pipe, or split cylinder, after being released from the dies, is pushed endwise from the forming machine I by means of any suitable type of ejector K, such as, for example, a rack-type driven by motor L, on to the conveyor M and into feed mechanism N, driven by motor O. The feed mechanism N pushes the partially formed pipe into two forming stands P, having four rolls each and driven by motors Q, where the edges of the pipe are abutted or joined and the forming completed. From the forming stands P the pipe is discharged onto conveyor R where it is fed into either one of two pushers S. These pushers S engage the back end of the pipe, forcing it at a constant predetermined speed through welding rolls T into sizing rolls U, driven by motors W. The sizing rolls U continue pulling the pipe through the welding rolls T and into straightening rolls X, driven by motors Y, completing the pipe. Pushers S may be arranged to be driven by motors W, or by separate motors with control arranged for synchronizing their speeds.

The general description thus given will serve to indicate the general type of machine for the complete and continuous operation of forming the finished pipe from the skelp, of which this invention is a part, and the manner in which it cooperates therewith. A more particular description of the invention will now be given.

*The pipe-forming machine.*—Referring now to Figs. 2 and 3, the pipe-forming mechanism consists essentially of a stand or mount 10 which consists of three parts or frames 11, 12 and 13. On the frame 11 are mounted three gear drives 14, each for driving two cranks 15 connected by pitmen 16 to a ram 17 (which may be unitary or in sections) extending for the entire length of the machine. This ram is mounted on a slide 18 carried by the frame 12. The gear drives 14, housed in the casings 19, are driven by motors 20 through shaft 21 and pinions 22. The pinions 22 drive gear wheels 23 which in turn drive gear wheels 25 by means of pinions 24. The six cranks 15 are driven by the gear wheels 25 by means of crank arms 26 and therefore upon a single rotation of the gear wheels 25, apply equally distributed forces on the ram 17, in forcing it to move longitudinally to the left (in Fig. 3) on the slide 18.

Figure 4:
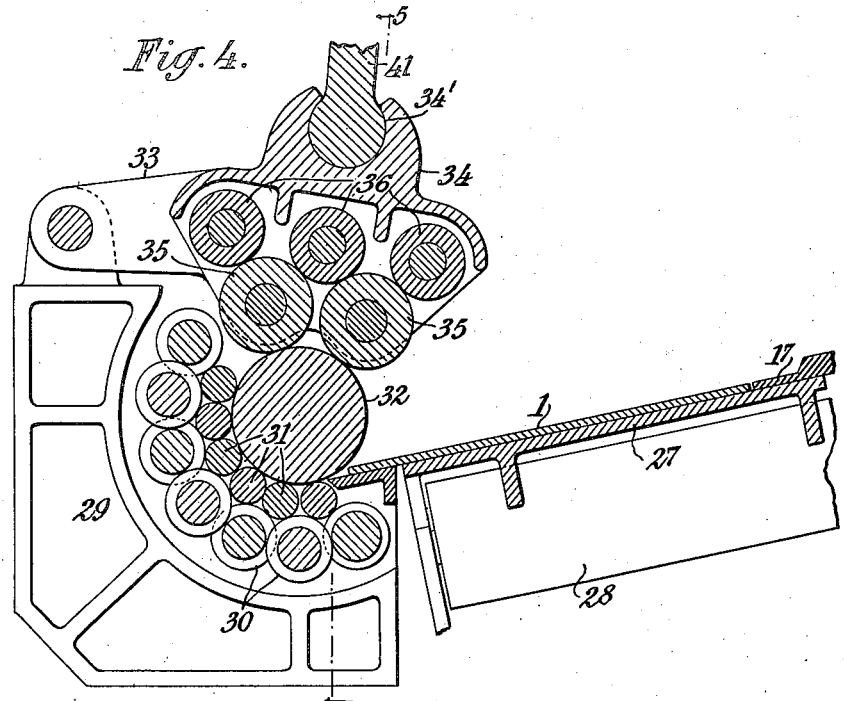
Fig. 4 is an enlarged sectional view, taken on the line 4—4 of Fig. 5, partly broken away and showing the skelp in position to be acted upon by the ram.
Figure 5:
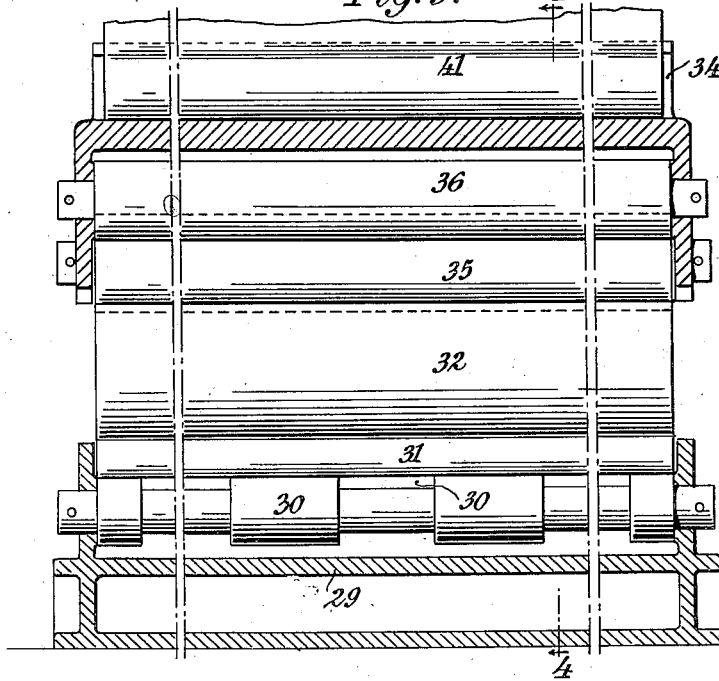
Fig. 5 is a sectional view, taken on the line 5—5 of Fig. 4, partly broken away.

Mounted on one end of the frame 13 is an inclined table 27. Adjacent the table 27 and mounted therein are rollers 28, which carry the skelp into operative position. The rollers 28 are mounted below the table 27, the table having spaces or interruptions through which the upper parts of the peripheries of the rollers extend when the latter are feeding the skelp. After the skelp is fed to position, the rollers are lowered by suitable mechanism, so that the skelp rests on the table 27. Above the table are a series of spaced top guides 128 which overlie the skelp and prevent its buckling during the feeding movement of the skelp into the forming rolls. These top guides 128 have an up and down movement, being raised to permit the introduction of the skelp, and being lowered during the operation of feeding the skelp. A convenient method of operating the rollers 28 and the top guides 128 is to attach them to a common frame which is raised temporarily during the feeding movement by cams 129 mounted on a shaft 130, which cams engage the under side of the frame to produce the lifting movement of the latter. Shaft 130 is driven through gearing by drive shaft 131 by any suitable motor (not shown). On the other end of the stand 13 and adjacent the table 27 is a cradle 29 in which are concentrically and rotatably mounted backing-rolls 30. These rolls 30 flotatably support on and between the surfaces thereof and in rotational contact therewith die-rolls 31. The die-rolls 31 flotatably support in rotational contact therewith mandrel 32. Pivotally mounted on the top of the cradle 29 is an oscillatable frame 33 having a roll-holder portion 34 in which are rotatably mounted pressure rolls 35 and pressure backing rolls 36 in rotational contact therewith. The rolling dies 31 and the pressure rolls 35 with their backing rolls 36 are discontinuous and made up in sections which are butted end to end in the machine. The mandrel 32 is continuous for the larger sizes of pipe but may be made up of several parts fastened together, depending upon the length of pipe to be made. As shown in Figs. 4 and 5, the backing rolls 30 are crenelated in contour and have complementary inter-projecting portions.

Mounted on the shaft 37 which is journaled at 38 in the upper portion of the frame 13 are rocker arms 39. One end 40 of these rocker arms is pivotally connected by links 41 to the roll-holder 34 by means of ball and socket joints 41' and 34', respectively. The other end 42 of this rocker arm is pivotally connected through links 43 and toggle-joints 44 to hydraulic or other pressure cylinders 45. Normally a regulated pressure is applied from the cylinders 45 through the links 43, toggle-joints 44, rocker arms 39, and links 41 to the roll-holder 34 and hence to the pressure rolls 35. This pressure is communicated to the mandrel 32 when the toggles are unbroken, and therefore to the die-rolls 31. The toggles are controlled by a shaft 37$^a$ (Figs. 2 and 3) which is provided with a series of cranks 37$^b$ which are connected to the toggle joints by links 44. The shaft 37$^a$ is driven by a motor such as 46, and is so timed that the toggles are broken after the pipe is formed, thereby releasing the pressure rolls 35 and allowing the formed pipe to free itself from the mandrel and the rolls.

When the formed pipe has freed itself from the mandrel and the rolls, as shown in Fig. 7, a pipe-ejector 47 of any suitable kind such as, for example, a rack type, driven by motor 47', is located at one end of the pipe-former and adjacent the die rolls. This ejector ejects the pipe endwise or longitudinally out from between the mandrel and rolls.

The die-rolls, backing-rolls, mandrel and the pressure-rolls are replaceable in order to accommodate various sizes of pipe.

As shown in Fig. 6, in place of the pressure rolls 35 and their backing-rolls 36, a single pressure roll 47$^a$ may be used. In this case the pressure roll 47$^a$ is rotatably mounted from one end of a support 48 which is pivotally secured to casing 49. The other end 50 of this support may be connected in any suitable manner, as, for example, is shown above, to a regulated controlled pressure system, in order that the pressure on the roll 47ª may be regulated or relieved. A replaceable anvil or guide 51 is mounted either between the pressure roll 47ª and one of the backing rolls 52 or between the pressure roll 47ª and a die-roll 53.

*Operation.*—As shown in Fig. 4, the pressure rolls 35 rest on the mandrel 32 which in turn rests on the die-rolls 31. A predetermined pressure is applied from the pressure cylinders to the pressure rolls, as described above, and hence to the mandrel, the pressure depending upon the thickness of the skelp or material from which the pipe is to be formed. With the sheet or skelp 1 and the ram 17 in the position as shown in this figure, when pressure is applied to the ram 17, as above described, this pressure is communicated to the edge of the sheet 1. The ram 17 thus forces the sheet or skelp 1 edgewise between the die-rolls 31 and the mandrel 32. As the skelp 1 is pushed into the die, it first lifts the mandrel 32 and the pressure rolls 35. When the edge of the skelp reaches the second die-roll it starts to bend due to the pressure. The skelp continues around the mandrel until it comes in contact with the pressure rollers 35. The skelp then raises the pressure rolls off the mandrel and continues on its path through the die until it is formed into substantially a split cylinder or until it assumes the form as shown in Fig. 6. The ram 17 is then withdrawn to the position shown in dotted lines at 17'. The formed pipe is freed from the mandrel by breaking the toggle-joints 44, which relieve the pressure of the cylinders 45 on the pressure rolls 35, as already described hereinabove.

From the foregoing it is obvious that by varying the pressure on the pressure rolls by means of the hydraulic pressure cylinders 45, various bending forces can be produced suitable for various pipe thicknesses and for material of varying resistance. It will also be readily seen that by changing the size of the rolls and the mandrel various sizes of pipe can be made in the same machine.

The operation of the pipe-former as shown in Fig. 6 is similar to that already described above for Fig. 4, with the exception that the anvil guide 51 contributes to the bending of the sheet as it passes thereunder.

From the foregoing the following advantages in the method herein disclosed over existing continuous forming mills will be apparent.

1. The skelp is pushed into the forming machine using the edge; the seam is therefore straight and parallel with the center line of the pipe.

2. Due to resistance to forming, a reasonable amount of side camber in the skelp will be straightened.

3. Variation in gauge in the same piece of skelp or between pieces of skelp does not affect operations.

4. Steels of various carbons or alloys can be made into pipe by adjusting pressure on dies only which requires only a few moments' time.

5. Pipe of the same outside diameter but varying wall thickness can be made by changing mandrel and pusher plate. This can be accomplished in comparatively little time.

6. Several sizes of pipes and casings with wide range of wall thickness and steel analysis can be made in one set of dies.

7. The entire machine can be varied and adjusted for different sizes of pipe in a few hours between runs.

8. Maintenance cost is low because dies have long life and replacement cost of rollers in dies is very low. Rolls in the forming stands may duplicate in size those in sizing stands.

9. The machine as thus described is capable of producing pipe in commercial practice at a comparatively low cost. This is due to the lack of necessity for skilled labor, except for welding; the low cost of adjusting the machine for different sizes, thicknesses and grades of metal; the better formation of the pipe and higher welding efficiency thus obtained; the low maintenance cost, due to the absence of wear; the low scrap loss, and the fact that trial runs are not necessary as is now the case with continuous forming mills.

While I have shown and described one embodiment of the invention as applied to one continuous method of manufacture of the completed pipe from the skelp as hereinabove disclosed, it will be understood that I do not wish to be limited thereto, since the invention may be applied to a variety of other methods of continuous operations which are well known in the art. I also do not wish to be limited to this embodiment of the invention as shown and described herein, since various changes may be made therein without departing from the spirit and scope of the appended claims.

It will also be understood that while my invention finds its greatest utility in the complete process of forming substantially completed pipes, the device may also be utilized for the forming of troughs or similar shapes or longitudinal sections of tubes or pipes by the very simple method of using narrower skelp than would be required to form the substantially completed pipe.

What I claim is:—

1. A pipe forming machine comprising a series of rotatable die elements arranged to form a greatly elongated die of substantially the full length of the pipe to be formed and spaced to permit side ingress of a strip of skelp, and means for pushing the strip of skelp sidewise into such rotatable die elements to bend the skelp into circular form throughout its length simultaneously, said pushing means engaging the rear side of the skelp and transmitting the main power for forming the skelp into circular shape.

2. A pipe forming machine comprising a series of roll dies, the peripheries of which are arranged in general circular form to form a greatly elongated die member having an ingress opening for the skelp along one side of the series, and means for pushing a strip of skelp sidewise simultaneously into said roll dies, whereby to bend the skelp simultaneously into substantial pipe form, said pushing means engaging the rear side of the skelp and transmitting the main power for forming the skelp into circular shape.

3. A pipe forming machine comprising a series of undriven freely rotatable roll dies, the peripheries of which are arranged in general circular form with an ingress opening for the skelp along one side of the series, means for pushing a strip of skelp sidewise simultaneously into said roll dies, whereby to bend the skelp simultaneously into substantial pipe form, and a mandrel arranged within the inner circle formed by the roll dies around which said skelp is bent.

4. A pipe forming machine comprising a series of die elements open at one side and extending substantially the length of the pipe to be formed, means for pushing a strip of skelp sidewise into said die elements to bend the skelp simultaneously throughout its length, said pushing means engaging the rear side of the skelp and transmitting the main power for forming the skelp into circular shape, a mandrel around which the skelp is bent, and pressure mechanism for forcing the mandrel toward the die elements, whereby the pipe is bent under pressure around the mandrel as it is pushed into the die elements.

5. A pipe forming machine having an interior rotatable die and surrounding die rolls, means for yieldingly pressing the interior die toward the die rolls, and means for pushing a strip of skelp sidewise simultaneously into contact with the interior and exterior die rolls, said pushing means engaging the rear side of the skelp and transmitting the main power for forming the skelp into circular shape.

6. A pipe forming machine having an interior rotatable die and surrounding die rolls, means for yieldingly pressing the interior die toward the die rolls, means for pushing a strip of skelp sidewise simultaneously into contact with the interior and exterior die rolls, and means for quickly releasing such pressure.

7. A pipe forming machine having a rotatable mandrel, a plurality of die rolls coacting therewith, a plurality of concentric backing rolls for said die rolls, a pressure roll for exerting pressure in the direction of said mandrel, and means for forcing the sheet to be formed edgewise between the mandrel and the die rolls.

8. A machine according to claim 1, in which the means for forcing the sheet to be formed into the die rolls comprises a reciprocating ram.

9. A machine according to claim 1, in which the means for forcing the sheet to be formed into the die rolls comprises a reciprocating ram having an edge for engagement with the edge of the sheet.

10. A machine according to claim 7, in which said backing rolls are concentrically mounted, said die rolls being flotatably supported by said backing rolls for rotational movement.

11. A machine according to claim 7, in which said mandrel is flotatably supported by said die rolls.

12. A machine according to claim 7, in which said backing rolls have a crenelated contour in side elevation.

13. A machine according to claim 7, in which said backing rolls have complementary inter-projecting portions.

14. A machine according to claim 7, in which said pressure roll is flotatably mounted for rotational movement.

15. A machine according to claim 7, in which said pressure roll is flotatably mounted for rotational movement toward and away from said mandrel.

16. A machine according to claim 7, in which there is an anvil guide for coacting with the sheet and said mandrel.

17. A machine according to claim 7, in which there is an anvil guide between the pressure roll and one of said backing rolls.

18. A machine according to claim 7, in which there is an anvil guide between said pressure roll and one of said die rolls.

19. A machine according to claim 7, in which said pressure roll has a support which is pivotally secured to said casing, in which support the roll is oscillatably mounted.

20. A pipe machine for acting upon a sheet comprising a mandrel, die rolls located around said mandrel, means for pushing the sheet edgewise between said rolls and said mandrel to form a split-cylinder, combined pressure devices for applying and relieving pressure on said mandrel and said rolls on said sheet during its passage therebetween, and an ejector for ejecting the said cylinder endwise from the said machine.

21. A machine according to claim 20, in which there is a table adjacent the said mandrel adapted to hold and position the sheet adjacent the said die rolls.

22. A machine according to claim 20, wherein said combined pressure devices comprise a rotary element.

23. A pipe machine for acting upon a sheet, comprising a mandrel, die rolls located around said mandrel, a pressure-exerting rotary element for applying and relieving pressure to said mandrel on said die rolls, a ram for pushing said sheet edgewise between said rolls and said mandrel to form substantially a split-cylinder, an ejector for ejecting said split-cylinder endwise from the machine, means for bringing the edges of the said cylinder into abutment to form a joint after ejection, and means for welding the edges of the said joint together to form a pipe.

24. The method of forming pipe from a sheet which comprises the steps of shaping the sheet into a split-cylinder by applying pressure edgewise of the sheet to force it around rolling die surfaces, removing the thus formed split-cylinder longitudinally, and closing the split in the cylinder to form a joint.

25. The method of forming pipe from a sheet which comprises the steps of shaping the sheet into a split-cylinder by applying pressure edgewise of the sheet to force it between opposed rotating curved surfaces under pressure, relieving the pressure, whereupon the said cylinder will free itself from the curved surfaces, removing the said formed split-cylinder longitudinally, and closing the split in the cylinder to form a joint.

26. The method of forming pipe from a sheet which comprises shaping the sheet into a split-cylinder by applying pressure edge wise of the sheet to force it between opposed rotating curved surfaces under pressure, relieving the pressure, whereupon the said cylinder will free itself from the curved surfaces, removing the said formed split-cylinder longitudinally, closing the split in the cylinder to form a joint, and welding the edges of said joint.

27. A pipe forming machine comprising open sided die elements arranged to form a die extending substantially throughout the length of the pipe to be formed, means for pushing a length of skelp sidewise simultaneously into such die elements, said pushing means engaging the rear side of the skelp and transmitting the main power for forming the skelp into circular shape, and means for supporting the top and bottom surfaces of the skelp during a portion of the pushing movement whereby to prevent buckling.

28. A pipe forming machine comprising open sided die elements arranged to form a die extending substantially throughout the length of the pipe to be formed, means for pushing a length of skelp sidewise simultaneously into such die elements, means for supporting the top and bottom surfaces of the skelp during a portion of the pushing movement whereby to prevent buckling, said means comprising guards overlying the skelp, and means for positioning said guards in operative position during the pushing movement of the skelp and in inoperative position while the skelp is being placed in position for the pushing operation.

LLOYD JONES.